(12) United States Patent
Ding et al.

(10) Patent No.: US 10,677,902 B2
(45) Date of Patent: Jun. 9, 2020

(54) EXCITATION INTERVAL FOR ULTRASONIC TRANSDUCER

(71) Applicant: TEXAS INSTRUMENTS INCORPORATED, Dallas, TX (US)

(72) Inventors: Lei Ding, Plano, TX (US); Srinath Mathur Ramaswamy, Murphy, TX (US)

(73) Assignee: TEXAS INSTRUMENTS INCORPORATED, Dallas, TX (US)

(\*) Notice: Subject to any disclaimer, the term of this patent is extended or adjusted under 35 U.S.C. 154(b) by 323 days.

(21) Appl. No.: 15/659,919

(22) Filed: Jul. 26, 2017

(65) Prior Publication Data
US 2019/0033434 A1 Jan. 31, 2019

(51) Int. Cl.
*G01S 7/52* (2006.01)
*G01S 15/89* (2006.01)

(52) U.S. Cl.
CPC ...... *G01S 7/52036* (2013.01); *G01S 7/52017* (2013.01); *G01S 15/8913* (2013.01); *G01S 15/8952* (2013.01)

(58) Field of Classification Search
CPC .............. G01S 7/52036; G01S 7/52017; G01S 15/8952; G01S 15/8913
USPC ............................................ 367/16, 87, 140
See application file for complete search history.

(56) References Cited

U.S. PATENT DOCUMENTS

| | | | |
|---|---|---|---|
| 3,387,257 A | 6/1968 | Brech | |
| 3,409,787 A | 11/1968 | Agalides et al. | |
| 5,087,850 A | 2/1992 | Suzuta | |
| 5,198,713 A | 3/1993 | Suzuta | |
| 5,460,595 A * | 10/1995 | Hall | A61B 8/546 310/316.01 |
| 6,731,569 B2 | 5/2004 | Yurchenko et al. | |
| 2015/0331100 A1 | 11/2015 | Hsu et al. | |
| 2018/0364341 A1 | 12/2018 | Ding et al. | |
| 2019/0033434 A1 | 1/2019 | Ding et al. | |
| 2019/0047019 A1 | 2/2019 | Ding et al. | |

\* cited by examiner

*Primary Examiner* — Daniel L Murphy
(74) *Attorney, Agent, or Firm* — Michael A. Davis, Jr.; Charles A. Brill; Frank D. Cimino

(57) ABSTRACT

An ultrasonic detection circuit includes a transmitter circuit that provides excitation signals to a terminal of an ultrasonic transducer to drive the ultrasonic transducer during an excitation interval. The excitation signals provided during the excitation interval include a first excitation signal at a first resonant frequency of the ultrasonic transducer followed by a second excitation signal at a second resonant frequency of the ultrasonic transducer. The first resonant frequency is different from the second resonant frequency.

18 Claims, 5 Drawing Sheets

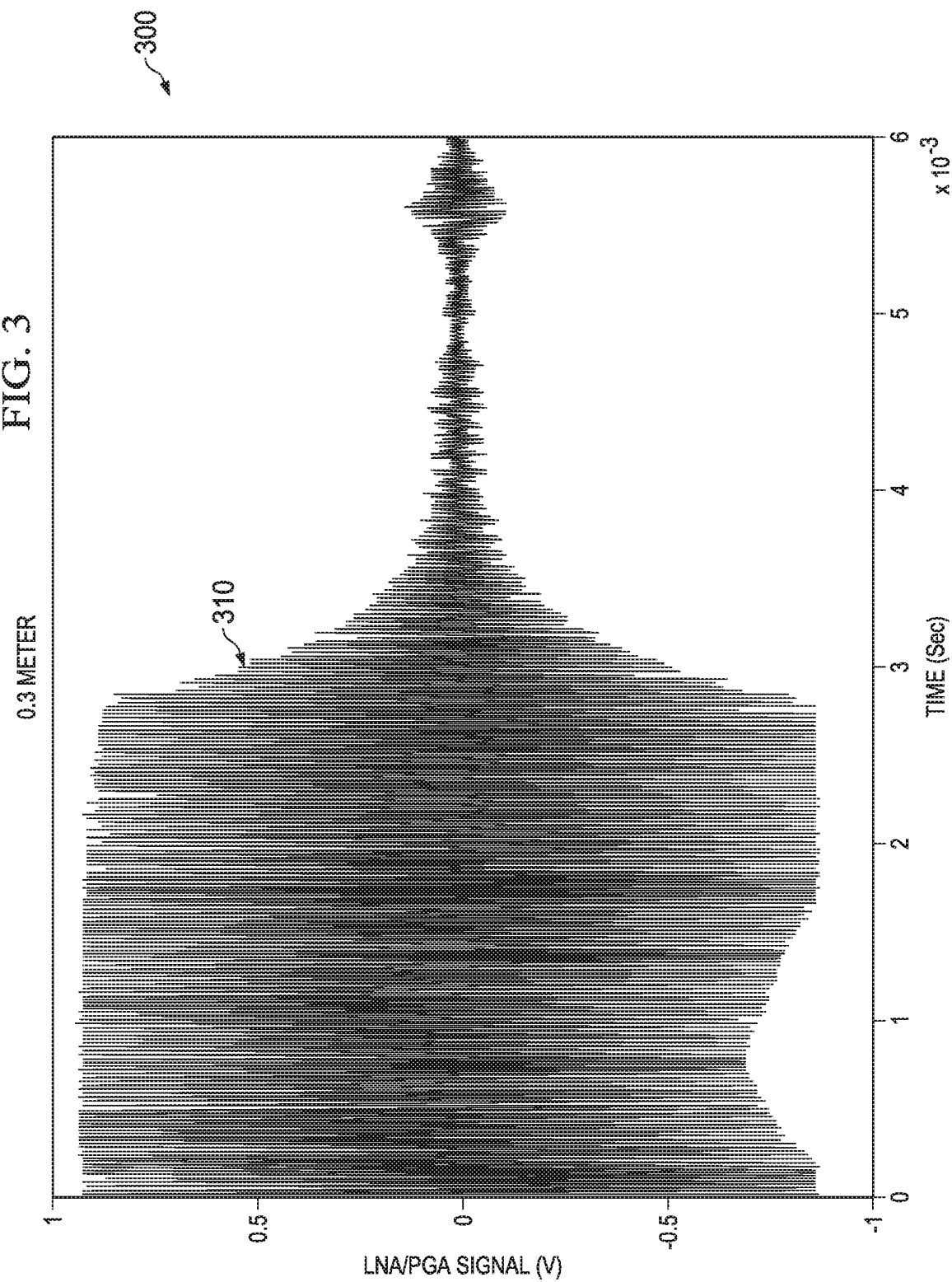

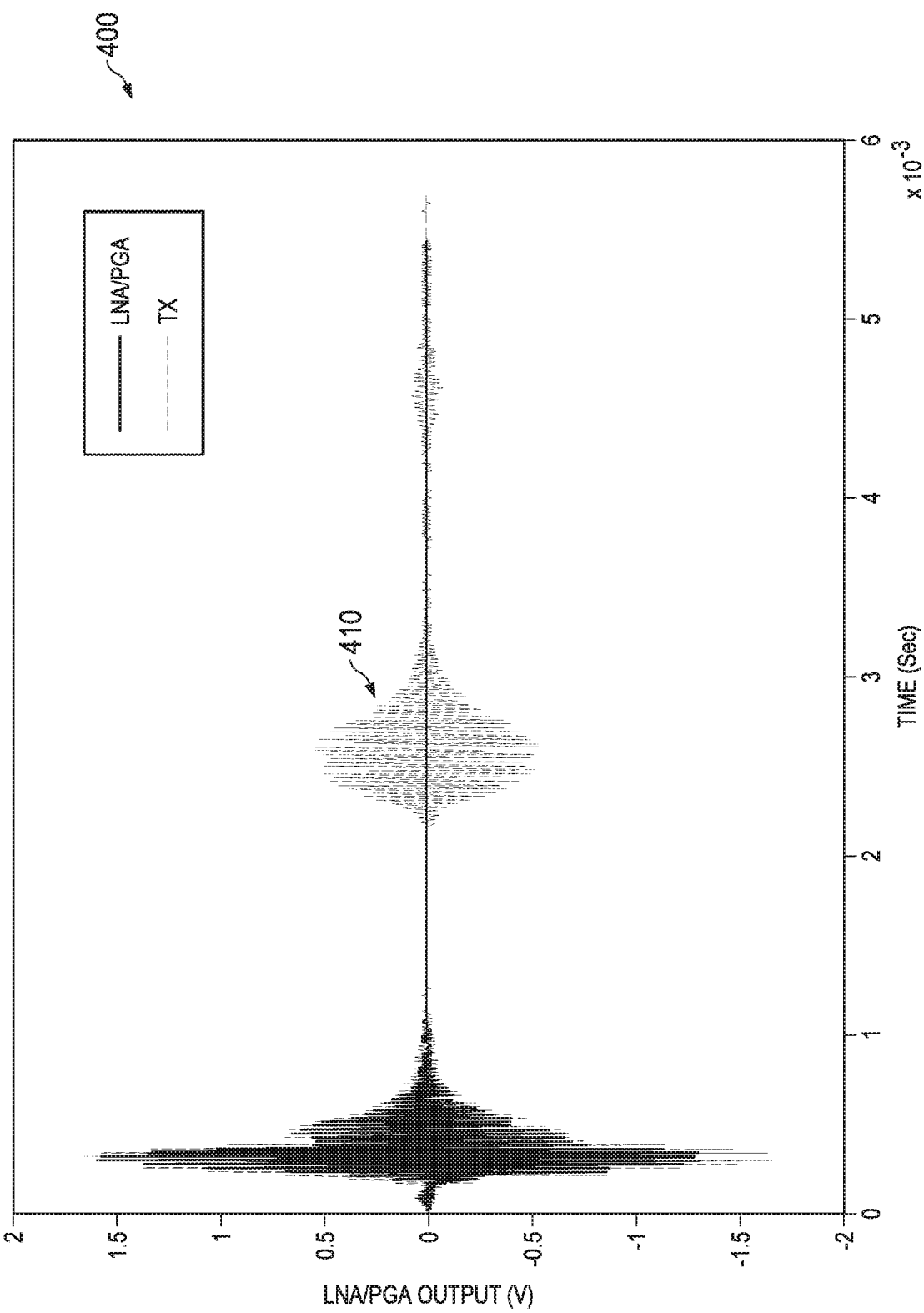

EXCITATION INTERVAL FOR ULTRASONIC TRANSDUCER

TECHNICAL FIELD

This disclosure relates to electrical circuits, and more particularly to providing separate excitation signals having different frequencies during an excitation interval to an ultrasonic transducer.

BACKGROUND

Ultrasonic transducers convert electrical alternating current (AC) signals into ultrasound, as well as converting ultrasound signals into AC signals. Ultrasonic transducers typically are piezoelectric transducers where piezoelectric crystals change size and shape when a voltage is applied. An applied AC voltage causes them to oscillate at the same frequency and produce ultrasonic sound. The beam pattern of the transducer can be determined by the active transducer area and shape, the ultrasound wavelength, and the sound velocity of the propagation medium such as air. Since piezoelectric materials generate a voltage when force is applied to them, they can also work as ultrasonic detectors. Some systems use a separate transmitter to excite the transducer and receiver to receive reflected ultrasound signal. Other systems combine both transmitter and receiver functions using a single transceiver, where the transducer is excited for a period by the transmitter and then utilized to detect reflected energy from a target after excitation.

SUMMARY

This disclosure relates to providing excitation pulses to an ultrasonic transducer during an excitation interval.

In one example, an ultrasonic detection circuit includes a transmitter circuit that provides excitation signals to a terminal of an ultrasonic transducer to drive the ultrasonic transducer during an excitation interval. The excitation signals provided during the excitation interval include a first excitation signal at a first resonant frequency of the ultrasonic transducer followed by a second excitation signal at a second resonant frequency of the ultrasonic transducer. The first resonant frequency is different from the second resonant frequency.

In another example, a method includes generating a first set of excitation signals at a first resonant frequency of an ultrasonic transducer during a first portion of an excitation interval. The method includes generating a second set of excitation signals at a second resonant frequency of the ultrasonic transducer during a second portion of the excitation interval, the first resonant frequency being different from the second resonant frequency. The method includes exciting the ultrasonic transducer during the excitation interval according to the first and second set of excitation signals.

In yet another example, an ultrasonic detection circuit includes a transmitter circuit to provide excitation signals to an ultrasonic transducer. The transmitter circuit provides the excitation signals in response to excitation pulses. A signal generator provides the excitation pulses to the transmitter circuit. The excitation pulses are provided during a given excitation interval. The excitation pulses during the given excitation interval include a first set of excitation pulses at a dominant resonant frequency of the ultrasonic transducer followed by a second set of excitation pulses at a secondary resonant frequency of the ultrasonic transducer. The dominant resonant frequency is different from the secondary resonant frequency. A receiver circuit has an input and an output. The receiver input receives an electrical receive signal from the ultrasonic transducer in response to an echo ultrasound signal reflected from an object. The receiver output provides an amplified output signal based on the electrical receive signal. A filter filters the amplified output signal to filter ringing of the ultrasonic transducer in response to the second set of excitation pulses.

BRIEF DESCRIPTION OF THE DRAWINGS

FIG. 3 illustrates an example of an unfiltered signal where an echo signal is mixed with ringing from an ultrasonic transducer.

FIG. 4 is an example of a filtered signal where an echo signal is separated from ringing from an ultrasonic transducer.

DETAILED DESCRIPTION

This disclosure relates to providing separate excitation signals having different frequencies during an excitation interval to an ultrasonic transducer. A transmitter circuit provides the excitation signals to drive the ultrasonic transducer during the excitation interval. For example, different sets of the separate excitation signals are provided at different frequencies during each excitation interval, which defines the period in which the ultrasonic transducer is actively driven by the transmitter circuit. During a first set of excitation signals, the transducer is excited according a first frequency which in turn generates an ultrasonic signal at the first frequency. After exciting the transducer with the first excitation signal at the first frequency, a second set of excitation signals are generated at the end of the excitation interval at a different frequency from the first set. An echo signal is received and processed to detect proximity of an object. For example, the echo signal includes some of the signals reflected back to the ultrasonic transducer in response to ultrasound waves transmitted during its excitation.

Each of the frequencies of excitation signal can be provided at different resonant frequencies of the ultrasonic transducer. By providing excitation signals at different frequencies to drive the transducer during different portions of the excitation interval, ringing noise (interference) that is generated by the transducer in response to the second set of excitation signals can be effectively filtered from the received echo signal. This allows objects to be detected at closer distances to the transducer because the ringing of the transducer due to excitation at the second resonant frequency can be separated in frequency and filtered from the echo signal that is reflected from the object in response to excitation of the transducer at multiple resonant frequencies. Various signal generation circuits can be provided to generate the excitation signals at the different frequencies. Also, various filtering methods can be applied to separate the received echo signal from the ringing of the transducer.

Figure 1:
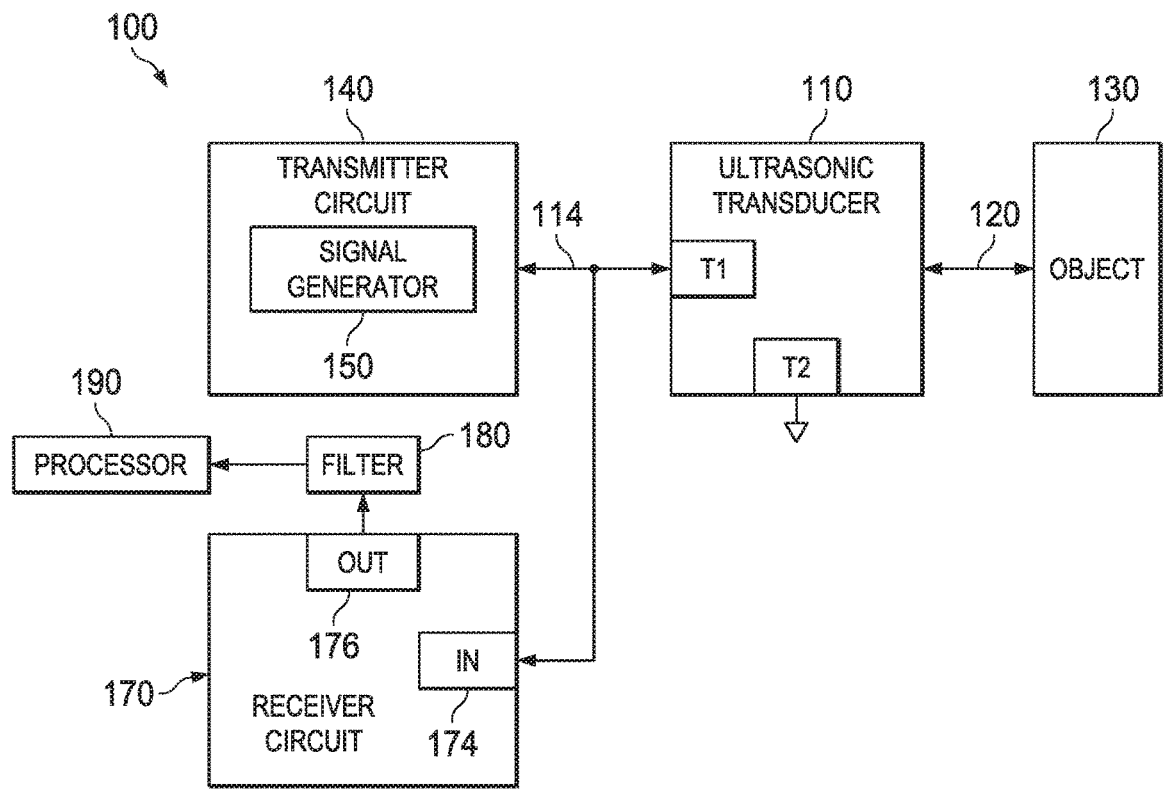
FIG. 1 illustrates an example block diagram of an ultrasonic detection circuit that provides separate excitation pulses during an excitation interval to an ultrasonic transducer.

FIG. 1 illustrates an example block diagram of a circuit 100 that provides separate excitation pulse sets during an excitation interval to an ultrasonic transducer. As used herein, the term "circuit" can include a collection of active and/or passive elements that perform a circuit function, such as an analog circuit or control circuit. Additionally or alternatively, for example, the term "circuit" can include an integrated circuit (IC) where all and/or some of the circuit elements are fabricated on a common substrate (e.g., semiconductor substrate, such as a die or chip).

The circuit 100 includes the ultrasonic transducer 110 having a first terminal T1 and a second terminal T2. In this example, the first terminal T1 receives excitation signals at 114 and the ultrasonic transducer 110 transmits an ultrasound signal 120 in response to the excitation signals. The ultrasound signal 120 is transmitted (wirelessly) and after a period of time (e.g., time it takes for signal to propagate in air) touches an object 130 which reflects some of the ultrasound energy as an echo signal. The ultrasonic transducer 110 receives the echo signal and provides a corresponding electrical receive signal at T1.

A transmitter circuit 140 generates the excitation signals at 114 that are provided to the first terminal T1 of the ultrasonic transducer 110. The transmitter circuit 140 drives T1 of the ultrasonic transducer 110 at 114 during each excitation interval. The excitation interval refers to each time period during which the transmitter circuit actively drives the transducer via the excitation signals at 114. The excitation signals provided during the excitation interval include a first excitation signal at a first resonant frequency of the ultrasonic transducer followed by a second excitation signal at a second resonant frequency of the ultrasonic transducer. The first resonant frequency is different from the second resonant frequency. For example, the first resonant frequency may be at 40 kHz whereas the second resonant frequency is at 50 kHz, where the first resonant frequency is different from the second resonant frequency. In some examples, one or the resonant frequencies of the ultrasonic transducer may be referred to as a dominant resonant frequency and the other resonant frequency may be referred to as a secondary resonant frequency where the dominant resonant frequency provides may provide a larger signal output from the transducer than the secondary resonant frequency.

In some examples, the transmitter circuit 140 can include a signal generator 150 to provide the excitation signals at 114 during a given excitation interval. The signal generator 150 can be an internal circuit within the transmitter circuit 140 or provided as an external circuit, where the transmitter circuit amplifies excitation pulses received from the external signal generator (see, e.g., FIG. 7) to generate the excitations signals at 114. In some examples, the transmitter circuit 150 can be configured to provide alternating sets of excitation signals (e.g., pulses) having different frequencies. In other examples, the signal generator 150 can be provided as an internal or external active circuit that generates pulses having different frequencies to the transmitter circuit 150, where the transmitter circuit 150 amplifies the pulses received from the signal generator 150 to provide the excitation signals at 114.

A receiver circuit 170 has an input 174 and an output 176. The receiver input 174 receives the electrical receive signal from T1 of the ultrasonic transducer 110 in response to an ultrasonic echo signal reflected from the object 130. The receiver output 176 provides an amplified output signal based on the electrical receive signal. A filter 180 filters the amplified output signal to filter ringing of the ultrasonic transducer in response to the second set of excitation signals. As used herein, the term ringing refers to the amount of time it takes for the signal amplitude of the transducer at T1 to drop below a threshold after being excited by the excitation signals at 114. The ringing that occurs in response to excitation causes noise that can adversely affect short range sensing because the echo signal from the transducer 110 can be mixed with the ringing. In some existing circuit designs, the received echo signals from the object 130 cannot be received without until the ringing of the transducer 110 in response to excitation has dampened (e.g., dampened below the threshold). The time to dampen thus affects how close the object 130 can be to the transducer 110 such that the ringing does not interfere with the echo signal.

In the example circuits and methods described herein, the second set of excitation signals supplied to the transducer 110 during each excitation interval causes ringing to occur at a different frequency than the first set of excitation signals. In this manner, the object 130 can be detected closer to the transducer 110 since the ringing frequency (corresponding to the second set of excitation signals) which affects close range sensing can be filtered from the frequency of the echo signal received from the object in response to the first set of excitation signals.

The filter 180 thus is configured to remove noise due to ringing and allow the echo signal which is the signal of interest for range detection of the object 130 to be discriminated from such noise. Output from the filter 180 can be processed by a processor 190 (e.g., digital signal processor) to determine the distance of the object (e.g., calculate distance to the object based on the speed of sound and when the echo signal is received). The processor 190, the transmitter 140, the pulse generator 150, the receiver 170, and/or the filter 180 can be implemented on a common substrate of an IC chip.

In one example, the transmitter circuit 140 provides the first excitation signal at a lower frequency than the second excitation signal. In another example, the transmitter circuit 140 provides the first excitation signal at a higher frequency than the second excitation signal. The transmitter circuit or pulse generator 150 can include a numerically controlled oscillator (NCO) in one example to provide the first excitation signal at one frequency in response to a first numerical setting applied to the NCO and to provide the second excitation signal at a different frequency in response to a second numerical setting applied to the NCO. For example, a timer circuit in the pulse generator 150 can apply the first numerical setting to the NCO for one period time and the second numerical setting to the NCO during a different period of time. The transmitter circuit 140 or pulse generator 150 in another example can include at least two sources with each source set at a different frequency, where different excitation signals are provided at different frequencies by switching between the sources.

Figure 2:
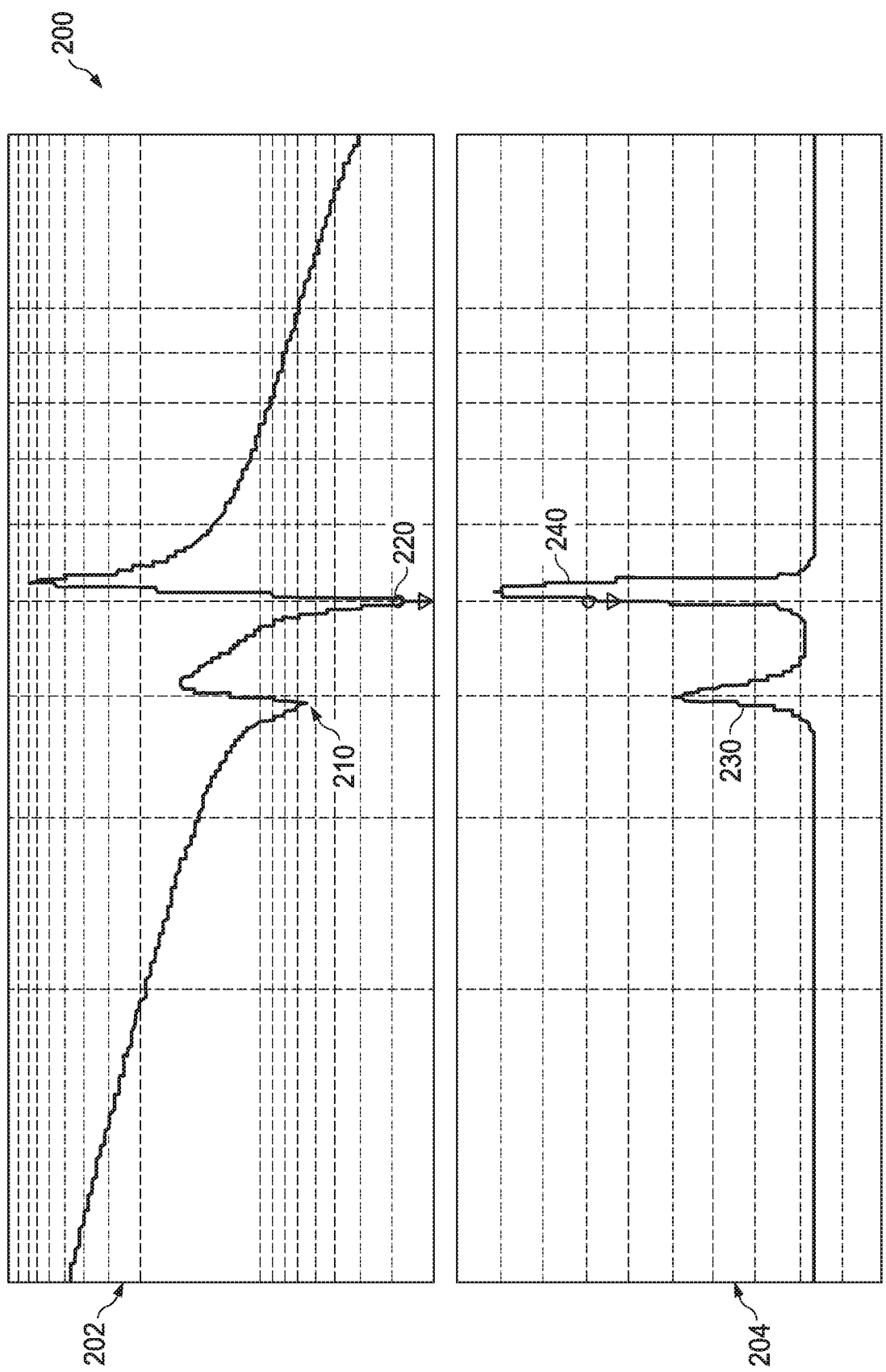
FIG. 2 illustrates an example of an impedance diagram for an ultrasonic transducer.

The filter 180 filters the amplified output signal 176 from the receiver 170 to remove the second resonant frequency to thereby enable the echo signal to be identified apart from ringing of the ultrasonic transducer at the second resonant frequency. The filter 180 can be implemented as an analog filter and/or a digital filter provided by the processor 190. In one example, the filter 180 can be a bandpass filter set to the frequency of the first excitation signal to filter ringing of the ultrasonic transducer in response to the second excitation signal. In another example, the filter 180 can be a low pass filter if the first excitation signal is at a lower frequency than the second excitation signal. In yet another example, the filter 180 can be a high pass filter if the first excitation signal is at a higher frequency than the second excitation signal FIG. 2 illustrates an example of an impedance diagram 200 having a magnitude diagram 202 and related phase diagram 204 for an ultrasonic transducer. With respect to the magnitude 202 (or the absolute value of) the impedance diagram 200, frequency in Hz is represented along the horizontal axis and impedance in Ohms is represented on the vertical axis. On the phase diagram 204 of the impedance 200, frequency is represented along the horizontal axis in Hz and phase shift is represented on the vertical axis in degrees. Regarding the impedance diagram 200, the impedance is observed from the two terminals of the transducer and is a complex number that varies with frequency. The absolute value of the impedance is represented in the diagram 202. A first valley 210 in the diagram 202 corresponds to a first resonance frequency (e.g., dominant frequency) at 40 KHz, at which frequency the transducer can generate maximum sound pressure level (SPL). This frequency is generally used as the primary operating frequency. A second valley 220 corresponds to a secondary resonance frequency at 50 KHz, at which frequency the transducer can resonate, but the output SPL is lower than the output SPL at the first or dominant resonant frequency. The diagram 204 shows two phase shift peaks of the transducer that correlate to the resonant frequencies 210 and 220 of the diagram 200.

In other transducer examples, different resonant operating frequencies may occur depending on the construction and type of transducer. In some cases, the points 210 and 220 may have different impedance values when the transducer resonates at the given frequency. In other examples, the resonant points 210 and 220 can have similar impedance values when the transducer is at resonance. Since the transducer can generate an ultrasonic signal at frequencies aligned at either peak 210 or 220, one resonant frequency can be used to generate an echo signal to be reflected from an object while the second resonant frequency can be used to change the ringing frequency of the transducer from that of the echo signal. As a result, the frequency of the echo signal can be discriminated from the frequency of the ringing (e.g., by filtering).

FIG. 3 illustrates an example of an unfiltered signal 300 where an echo signal is mixed with ringing from an ultrasonic transducer as shown at 310. The horizontal axis represents time in milliseconds whereas the vertical axis represents volts as seen at the receiver. At approximately 3 milliseconds, which correlates to an object reflecting an echo signal at about 0.3 meters, the received echo signal is mixed with the excitation signal of the transducer as shown at 310. After filtering is applied to the signal 300, such as disclosed herein, FIG. 4 provides an example of a filtered signal 400 where an echo signal 410 is separated from ringing from the ultrasonic transducer. As noted previously, analog and/or digital filtering can be applied to filter the ringing from the signal shown at 310 of FIG. 3 to provide the filtered echo signal shown at 410 of FIG. 4. The filter can be a bandpass filter set to the frequency of the first set of excitation pulses to filter out ringing of the ultrasonic transducer in response to the second set of excitation pulses (being outside the pass band). In another example, the filter can be a low pass filter where the first set of excitation pulses is at a lower frequency than the second set of excitation pulses. In yet another example, the filter can be a high pass filter where the first set of excitation pulses is at a higher frequency than the second set of excitation pulses.

Figure 5:
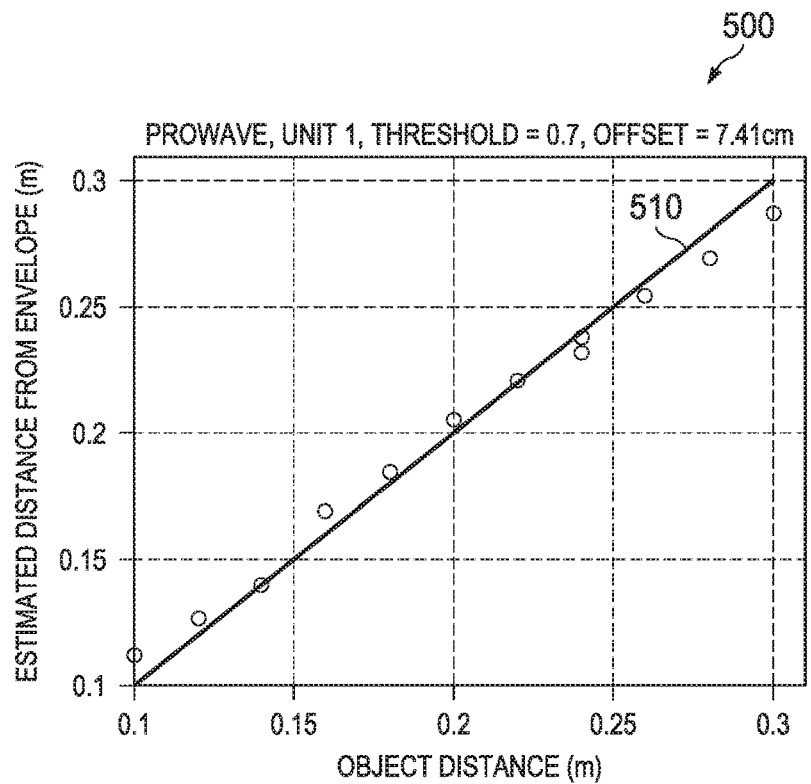
FIG. 5 is an example diagram that shows measurement accuracy of an ultrasonic transducer when separate excitation signals having different frequencies are applied to the transducer.

FIG. 5 is an example diagram 500 that shows measurement accuracy of an ultrasonic transducer when separate excitation pulse sets are applied to the transducer. In this example, the horizontal axis represents actual distance in meters to a detected object whereas the vertical axis represents estimated distance in meters of the object to the transducer after the filtering and processing described herein to determine the object distance. As shown by line 510, actual and estimated distances for the object are substantially correlated at sensing ranges that are less than or about 0.1 meters between the object and the transducer. In conventional single excitation systems, object sensing would be greater than 0.2 meters since the transducer's ringing would have to sufficiently dampen before reflected signals from the object could be analyzed without interference from the transducer ringing.

Figure 6:
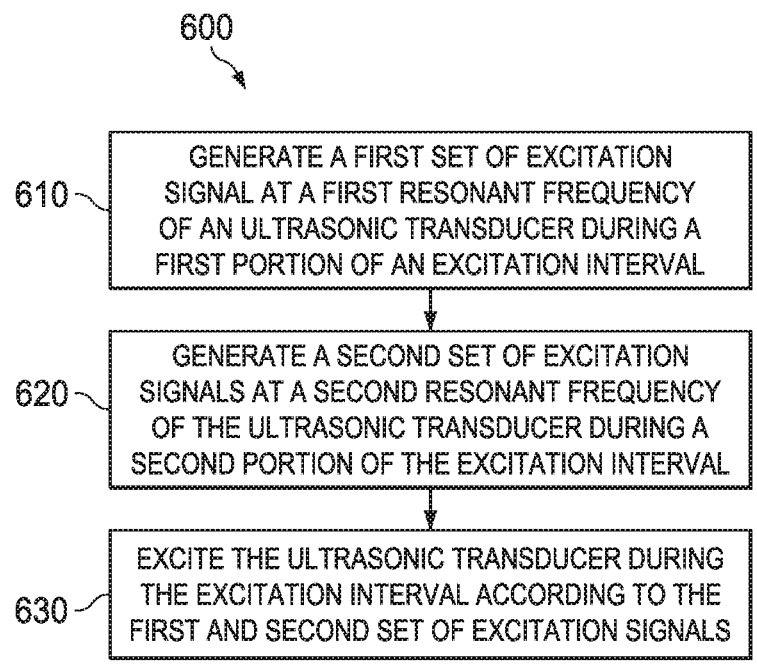
FIG. 6 illustrates an example method that provides separate excitation signals having different frequencies during an excitation interval to an ultrasonic transducer.

In view of the foregoing structural and functional features described above, an example method will be better appreciated with reference to FIG. 6. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various hardware circuits and components configured to execute machine readable instructions stored in memory and executable by an integrated circuit or a processor, for example.

FIG. 6 illustrates an example method 600 that provides separate excitation pulse sets during an excitation interval to an ultrasonic transducer. At 610, the method 600 includes generating a first set of excitation signals at a first resonant frequency of an ultrasonic transducer during a first portion of an excitation interval (e.g., via signal generator 150 of FIG. 1). At 620, the method 600 includes generating a second set of excitation signals at a second resonant frequency of the ultrasonic transducer during a second portion of the excitation interval (e.g., via signal generator 150 of FIG. 1). The first resonant frequency is different from the second resonant frequency. At 630, the method 600 includes exciting the ultrasonic transducer during the excitation interval according to the first and second set of excitation signals (e.g., via transmitter circuit 140 of FIG. 1).

The method 600 can include generating the first set of excitation signals at a lower frequency than the second set of excitation signals. In another example, the method 600 can include generating the first set of excitation signals at a higher frequency than the second set of excitation signals. The method 600 can include adjusting a frequency of a signal generator to generate the first and second set of excitation signals at different frequencies or switching between different excitation sources to generate the first and second set of excitation signals at different frequencies. The method 600 can include receiving an electrical receive signal from the ultrasonic transducer in response to an echo signal reflected from an object and providing an amplified output signal based on the electrical receive signal. The method 600 can also include filtering the amplified output signal to remove the second resonant frequency to discriminate the echo signal from ringing of the ultrasonic transducer at the second resonant frequency. This can include applying a bandpass filter set to the frequency of the first set of excitation signals to filter ringing of the ultrasonic transducer in response to the second set of excitation signals. This can also include applying a low pass filter to the amplified output signal if the first set of excitation signals is at a lower frequency than the second set of excitation signals, or applying a high pass filter to the amplified output signal if the first set of excitation signals is at a higher frequency than the second set of excitation signals.

Figure 7:
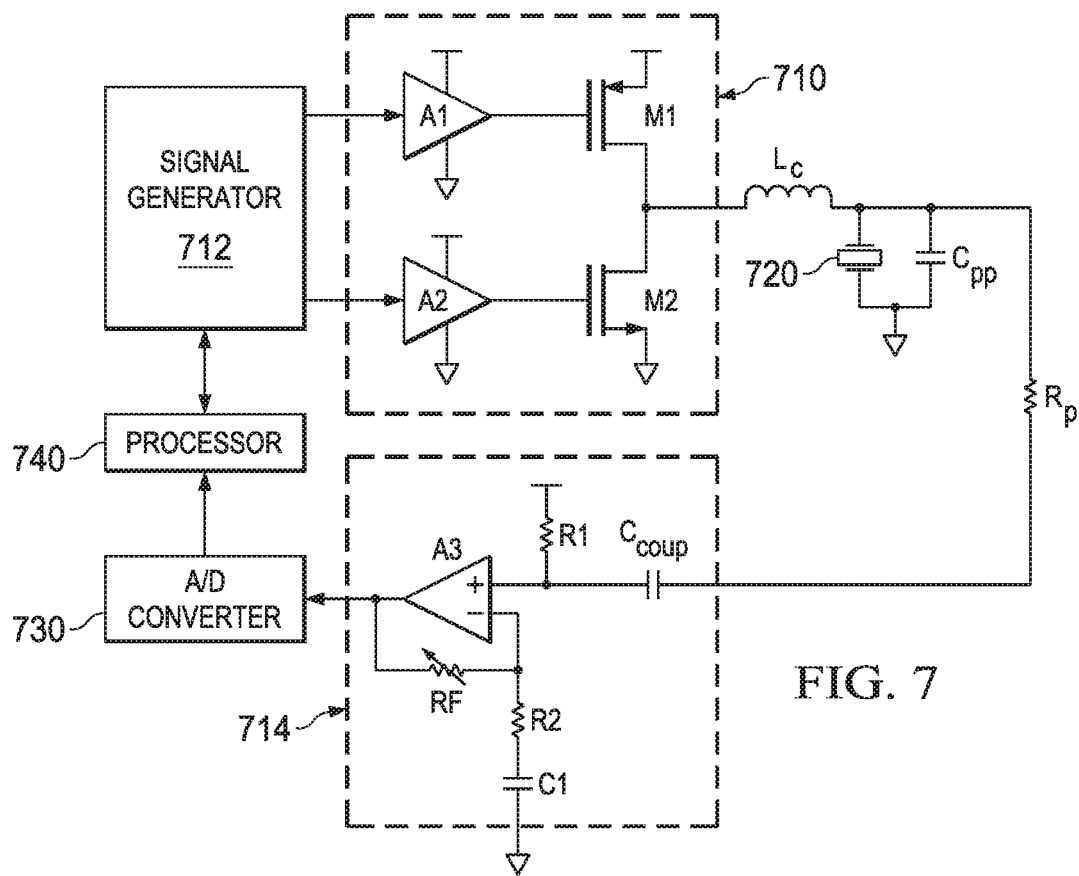
FIG. 7 illustrates an example of an ultrasonic detection circuit having a transmitter and receiver circuit where the transmitter circuit is driven from a pulse generator to provide separate excitation pulse sets during an excitation interval to an ultrasonic transducer.

FIG. 7 illustrates an example for a transmitter circuit 710 and receiver circuit 714 where the transmitter circuit is driven from a pulse generator 716 to provide separate excitation pulse signal sets to an ultrasonic transducer 720 during an excitation interval. The transmitter circuit 710 can include push/pull amplifiers A1 and A2 which in turn drive transistor drivers M1 and M2 (e.g., field effect transistors), which are coupled to provide an electrical drive signal to the transducer 720 according to amplified signals from A1 and A2 and in response to pulse set outputs from the pulse generator 716. Output from drivers M1 and M2 can be coupled though a series inductor Lc to the transducer 220. In some example circuits, the series inductor Lc is not used where a direct connection is provided between the drives and the transducer 220. In another example, the driver M1 and M2 can drive a transformer (not shown) to provide the electrical drive signal to the transducer 220. In the example of FIG. 2, a capacitor Cm can be coupled to a terminal of the transducer 220. In some example circuits, the capacitor Cm may be removed. Received electrical signals from the transducer 220 are coupled to the receiver circuit 214 via resistor Rp. The resistor Rp can couple the signal via coupling capacitor Ccoup to an amplifier A3 of the receiver 214. Resistor R1 can be provided as a pull-up whereas resistor Rf, R2, and capacitor C1 form a feedback network for amplifier A3. Output from amplifier A3 can be sent to an analog-to-digital (A/D) converter 730 which provides digital output to a processor 740. The processor 740 can provide digital filtering of the A/D output before determine the range of the object based on the received echo signal from the transducer 720, after filtering to remove signal frequencies that produce ringing in the transducer due to second pulse set during each excitation interval. Also, the processor 740 can monitor ringing of the ultrasonic transducer via the A/D converter 730 in response to the excitation signals. The processor 740 can adjust the number of pulses in the first or second excitation signal, the frequency of the first or second excitation signal, or the phase of the first or second excitation signal to mitigate the ringing (e.g., reduce the peak or the average of the signal received from the A/D).

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. Circuitry comprising:
a transmitter circuit including first and second sources adapted to be coupled to an ultrasonic transducer, in which the first source is configured to drive the ultrasonic transducer with a first excitation signal set having a first resonant frequency of the ultrasonic transducer, the second source is configured to drive the ultrasonic transducer with a second excitation signal set having a second resonant frequency of the ultrasonic transducer, the first resonant frequency is different from the second resonant frequency, and the transmitter circuit is configured to switch between the first and second sources to drive the ultrasonic transducer during an excitation interval with the first excitation signal set followed by the second excitation signal set.

2. The circuitry of claim 1, wherein the first resonant frequency is lower than the second resonant frequency.

3. The circuitry of claim 1, wherein the first resonant frequency is higher than the second resonant frequency.

4. The circuitry of claim 1, wherein the transmitter circuit includes a numerically controlled oscillator (NCO) configured to provide the first excitation signal set responsive to a first numerical setting applied to the NCO and to provide the second excitation signal set responsive to a second numerical setting applied to the NCO.

5. Circuitry comprising:
a transmitter circuit adapted to be coupled to an ultrasonic transducer, in which the transmitter circuit is configured to drive the ultrasonic transducer with first and second excitation signal sets having respective first and second resonant frequencies of the ultrasonic transducer, the first resonant frequency is different from the second resonant frequency, and the transmitter circuit is configured to drive the ultrasonic transducer during an excitation interval with the first excitation signal set followed by the second excitation signal set; and
a receiver circuit having a receiver input and a receiver output, in which the receiver input is adapted to be coupled to the ultrasonic transducer, and the receiver circuit is configured to:
at the receiver input, receive an electrical receive signal from the ultrasonic transducer responsive to a reflected echo signal; and
at the receiver output, provide an amplified output signal based on the electrical receive signal.

6. The circuitry of claim 5, wherein the amplified output signal has interference due to ringing of the ultrasonic transducer at the second resonant frequency, and the circuitry further comprises a filter having a filter input and a filter output, in which the filter input is coupled to the receiver output, and the filter is configured to reduce the interference by providing a filtered version of the amplified output signal at the filter output.

7. The circuitry of claim 6, wherein the filter includes a bandpass filter configured to reduce the interference by passing first resonant frequency components of the amplified output signal.

8. The circuitry of claim 6, wherein:
the first resonant frequency is lower than the second resonant frequency, and the filter includes a low pass filter configured to pass first resonant frequency components of the amplified output signal; or
the first resonant frequency is higher than the second resonant frequency, and the filter includes a high pass filter configured to pass the first resonant frequency components of the amplified output signal.

9. Circuitry comprising:
a transmitter circuit adapted to be coupled to an ultrasonic transducer, in which the transmitter circuit is configured to drive the ultrasonic transducer with first and second excitation signal sets having respective first and second resonant frequencies of the ultrasonic transducer, the first resonant frequency is different from the second resonant frequency, and the transmitter circuit is configured to drive the ultrasonic transducer during an excitation interval with the first excitation signal set followed by the second excitation signal set; and
a processor configured to monitor a ringing of the ultrasonic transducer responsive to the first and second excitation signal sets, and configured to mitigate the ringing by adjusting: a number of pulses in the first excitation signal set, a number of pulses in the second excitation signal set, the first resonant frequency, the second resonant frequency, a phase of the first excitation signal set, or a phase of the second excitation signal set.

10. A method, comprising:
generating a first set of excitation signals at a first resonant frequency of an ultrasonic transducer during a first portion of an excitation interval;
generating a second set of excitation signals at a second resonant frequency of the ultrasonic transducer during a second portion of the excitation interval, the first resonant frequency being different from the second resonant frequency;
exciting the ultrasonic transducer during the excitation interval according to the first and second set of excitation signals;
receiving an electrical receive signal from the ultrasonic transducer responsive to the exciting, the electrical receive signal including a reflected echo signal; and
amplifying the electrical receive signal to provide an amplified output signal.

11. The method of claim 10, wherein the first set of excitation signals has a lower frequency than the second set of excitation signals.

12. The method of claim 10, wherein the first set of excitation signals has a higher frequency than the second set of excitation signals.

13. The method of claim 10, wherein the excitation interval is a first excitation interval, and the method further comprises:
adjusting a frequency of a signal generator to generate the first and second sets of excitation signals during a second excitation interval; or
switching from a first source to a second source to generate the first and second sets of excitation signals during the second excitation interval.

14. The method of claim 10, wherein the amplified output signal has interference due to ringing of the ultrasonic transducer at the second resonant frequency, and the method further comprises reducing the interference by providing a filtered version of the amplified output signal.

15. The method of claim 14, wherein reducing the interference includes applying a bandpass filter to pass first resonant frequency components of the amplified output signal.

16. The method of claim 14, wherein:
the first resonant frequency is lower than the second resonant frequency, and reducing the interference includes low pass filtering to pass first resonant frequency components of the amplified output signal; or
the first resonant frequency is higher than the second resonant frequency, and reducing the interference includes high pass filtering to pass the first resonant frequency components of the amplified output signal.

17. Circuitry comprising:
a transmitter circuit adapted to be coupled to an ultrasonic transducer, in which the transmitter circuit is configured to provide excitation signals to the ultrasonic transducer responsive to excitation pulses;
a signal generator coupled to the transmitter circuit, in which the signal generator is configured to provide the excitation pulses to the transmitter circuit during an excitation interval, the excitation pulses include a first set of excitation pulses at a dominant resonant frequency of the ultrasonic transducer followed by a second set of excitation pulses at a secondary resonant frequency of the ultrasonic transducer, and the dominant resonant frequency is different from the secondary resonant frequency;
a receiver circuit having a receiver input and a receiver output, in which the receiver input is adapted to be coupled to the ultrasonic transducer, the receiver circuit is configured to receive an electrical receive signal from the ultrasonic transducer at the receiver input responsive to a reflected echo ultrasound signal, the receiver circuit is configured to provide an amplified output signal at the receiver output based on the electrical receive signal, and the amplified output signal has interference due to ringing of the ultrasonic transducer at the secondary resonant frequency; and
a filter having a filter input and a filter output, in which the filter input is coupled to the receiver output, and the filter is configured to reduce the interference by providing a filtered version of the amplified output signal at the filter output.

18. The circuitry of claim 17, wherein the filter includes a bandpass filter configured to reduce the interference by passing first resonant frequency components of the amplified output signal.

* * * * *